United States Patent
Sim et al.

(10) Patent No.: US 10,029,628 B2
(45) Date of Patent: Jul. 24, 2018

(54) INSULATION FIBER COMPOSITE WITH EXCELLENT FORMABILITY AND SURFACE PROPERTY, AND MANUFACTURING METHOD FOR THE SAME

(71) Applicants: Hyundai Motor Company, Seoul (KR); Kia Motors Corporation, Seoul (KR)

(72) Inventors: Jae Gi Sim, Seoul (KR); Jin Woo Park, Gyeonggi-Do (KR); Tae Wan Kim, Gyeonggi-do (KR); Jin Ha Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 37 days.

(21) Appl. No.: 15/189,033

(22) Filed: Jun. 22, 2016

(65) Prior Publication Data
US 2017/0166142 A1    Jun. 15, 2017

(30) Foreign Application Priority Data
Dec. 9, 2015  (KR) .................. 10-2015-0174755

(51) Int. Cl.
    *B60R 13/08*    (2006.01)
    *B32B 7/12*     (2006.01)
    *B32B 5/02*     (2006.01)

(52) U.S. Cl.
    CPC .............. *B60R 13/08* (2013.01); *B32B 5/022* (2013.01); *B32B 7/12* (2013.01); *B60R 13/0838* (2013.01);
    (Continued)

(58) Field of Classification Search
    CPC . B60R 13/0815; B60R 13/08; B60R 13/0838; B60R 13/0861; B60R 13/083;
    (Continued)

(56) References Cited

U.S. PATENT DOCUMENTS 5,923,002 A * 7/1999 McGrath .................. B32B 5/26
                                                    181/290
8,256,572 B2 * 9/2012 Castagnetti ......... B60R 13/0815
                                                    181/210
(Continued)

FOREIGN PATENT DOCUMENTS

JP      2009-249780 A    10/2009
KR   10-2007-0098486 A   10/2007
(Continued)

*Primary Examiner* — D Glenn Dayoan
*Assistant Examiner* — Sunsurraye Westbrook
(74) *Attorney, Agent, or Firm* — Mintz Levin Cohn Ferris Glovsky and Popeo, P.C.; Peter F. Corless (57) ABSTRACT

Disclosed is an insulation fiber composite. In particular, a surface of the insulation fiber composite is substantially improved such that a shape of three dimensions can be maintained as a heat resisting fiber and an insulation material are integrated. The insulation fiber composite of the present invention has excellent formability and surface property and comprises an insulation layer; and a pair of inorganic fiber layers. A first inorganic fiber layer of the pair is stacked on an upper surface of the insulation layer and a second inorganic fiber layer is stacked on a lower surface of the insulation layer, respectively. In particular, each the inorganic fiber layers has a greater planar surface area than a planar surface area of the insulation layer such that the insulation is not exposed to an exterior when the insulation layer and the pair of the inorganic fiber layers are stacked.

15 Claims, 4 Drawing Sheets

(52) U.S. Cl.
CPC ...... *B60R 13/0876* (2013.01); *B32B 2262/10* (2013.01); *B32B 2262/105* (2013.01); *B32B 2262/108* (2013.01); *B32B 2605/00* (2013.01)

(58) Field of Classification Search
CPC ....... B60R 5/04; B60R 13/0846; B60R 13/02; B32B 27/32; B32B 27/12; B32B 3/12; B32B 3/263; B32B 27/065; B32B 2262/101; B32B 2605/00; B32B 2250/40
USPC .... 296/39.3, 39.1, 97.23, 191, 211, 214, 70; 428/98, 95, 99, 116, 121, 29, 81; 181/290, 284, 294, 286, 205, 211, 247
See application file for complete search history.

(56) References Cited

U.S. PATENT DOCUMENTS

| | | | |
|---|---|---|---|
| 8,261,876 B2 * | 9/2012 | Castagnetti | B60R 13/0815 181/210 |
| 8,863,897 B2 * | 10/2014 | Bertolini | G10K 11/002 181/204 |
| 2006/0201741 A1 * | 9/2006 | Inoue | G10K 11/168 181/204 |
| 2016/0297174 A1 * | 10/2016 | Kim | D04H 1/4374 |

FOREIGN PATENT DOCUMENTS

| | | |
|---|---|---|
| KR | 10-2013-0062133 A | 6/2013 |
| KR | 2013-0077506 A | 7/2013 |
| KR | 2013-0078005 A | 7/2013 |
| KR | 10-1439066 B1 | 9/2014 |

\* cited by examiner

INSULATION FIBER COMPOSITE WITH EXCELLENT FORMABILITY AND SURFACE PROPERTY, AND MANUFACTURING METHOD FOR THE SAME

CROSS REFERENCE TO RELATED APPLICATION

The present application claims priority of Korean Patent Application No. 10-2015-0174755 filed on Dec. 9, 2015, the entire contents of which is incorporated herein for all purposes by this reference.

TECHNICAL FIELD

The present invention relates to an insulation material that may be applied to a vehicle and a manufacturing method thereof. The insulation material may be formed in an insulation fiber composite including a heat resisting fiber and an insulation material. The insulation fiber may have a smooth surface and may suitably maintain a three dimensional shape, and further may provide improved formability and surface property.

BACKGROUND

In general, since high temperature heat is generated from an engine portion or an exhaust portion of a vehicle, an insulation material has been applied for preventing peripheral parts from being damaged or performances thereof to prevent deterioration by the high temperature heat being generated from an engine portion or an exhaust portion.

In early days, an insulation material has been manufactured in a board shape by processing polypropylene, gypsum, ceramic, rock wool, and so on, has been often used as the insulation material as being applied to a vehicle.

However, the above mentioned insulation material formed in a board shape has problems. For example, deformation such as warping has been easily occurred by high temperature after manufactured and manufacturing a complex shape has been limited due to the board shape of the material.

In addition, when the gypsum, ceramic, rock wool, and so on are used as materials for insulation, durability thereof may not be sufficient when it is used alone, appearance such as surface quality may not be suitable, and harmful components may be contained therein. Accordingly, those materials may not be applied as components for a vehicle.

In addition, in the related arts, an insulation material, which was manufactured by process stacking the fibers of different kind material and then, bonding the stacked fibers by using weaving or adhesive, has been developed. However, manufacturing process thereof is complicated such that manufacturing cost is increased. Further, the shape thereof is limited to a board shape of the base insulation material such that it is difficult to apply to the component requiring the complex shape.

The above information disclosed in this Background section is only to enhance the understanding of the background of the invention and therefore it may contain information that does not form the prior art that is already known in this country to a person of ordinary skill in the art.

SUMMARY OF THE INVENTION

In preferred aspects, the present invention provides an insulation fiber composite with excellent formability and surface property and a manufacturing method for the same thereby providing advantages of simple manufacturing process, improved surface property and flexibility thereof for forming a complex shape. In addition, the insulation fiber composite with improved formability and surface property may further provide advantages of ensuring excellent durability and being harmless to humans. Furthermore, the insulation fiber composite may still further provide advantages of improved heat insulation property and various functions.

In one aspect, the present invention provides an insulation fiber composite. The insulation fiber composite may comprise an insulation layer; and a pair of inorganic fiber layers. In particular, a first inorganic fiber layer of the pair may be stacked on an upper surface of the insulation layer and a second inorganic fiber layer of the pair may be stacked on a lower surface of the insulation layer, respectively. The first inorganic fiber layer and the second inorganic fiber layer each may have a greater planar surface area than a planar surface area of the insulation layer such that the insulation may not be exposed to an exterior when the insulation layer and the pair of the inorganic fiber layers are stacked.

Preferably, a mass per unit of the insulation fiber composite with may range from about 300 to 2,000 $g/m^2$.

Desirably, the insulation fiber composite may further include an adhesive layer spread between the insulation layer and each the inorganic fiber layers such that a binding force between the insulation layer and the inorganic fiber layer is improved. In particular, the adhesive layer may be a thermosetting adhesive.

The insulation layer may include any one of ceramic fiber, rock wool, and mineral and thus, that the insulation layer may have a heat-resisting temperature of about 600° C. or greater.

The inorganic fiber layers may be a silica non-woven fabric comprising a silica fiber having a length of about or greater.

The silica non-woven fabric may comprise a silica ($SiO_2$) in an amount of about 50 wt % or greater based on the total weight of the silica non-woven fabric, and the silica non-woven fabric may have a heat-resisting temperature of about 600° C. or greater.

The silica non-woven fabric may have a mass per unit thereof of about 200 to 1,000 $g/m^2$ and a tensile strength thereof of about 0.2 $kgf/cm^2$ or greater.

In another aspect, the present invention provides a method for manufacturing the insulation fiber composite. The method may comprise: preparing an insulation layer formed in a non-woven fabric; preparing a pair of inorganic fiber layers formed in a non-woven fabric to have a greater planar surface than a planar surface area of the insulation layer; spreading an adhesive to an upper surface and a lower surface of the insulation layer; and covering the insulation layer with the pair of the inorganic fiber layers; and integrating the insulation layer and the inorganic fiber layers by needle punching so that a mass per unit of the insulation fiber composite may be of about 300 to 2,000 $g/m^2$ after positioning the insulation layer between the pair of inorganic fiber layers. In particular, when the insulation layer is covered, a first inorganic fiber layer of the pair may be stacked on an upper surface of the insulation layer and a second inorganic fiber layer of the pair may be stacked on a lower surface of the insulation layer, respectively.

Preferably, the method may further comprise needle punching a silica fiber having the length of about 30 mm or greater so as to prepare the inorganic fiber layers with a mass per unit of about 200 to 1,000 g/m² and a tensile strength of about 0.2 kgf/cm² or greater.

Preferably, the insulation layer includes any one of ceramic fiber, rock wool, and mineral and the silica fiber may comprise a silica ($SiO_2$) in an amount of about 50 wt % or greater such that the insulation layer may have a heat-resisting temperature of about 600° C. or greater.

In certain aspects, the ceramic, as used herein, may include a metal element such as silicon aluminum titanium, zirconium oxygen, carbon, oxides formed by combining such as nitrogen, carbides, and known as the inorganic material made of a nitride.

In certain aspects, the rock wool, as used herein, may be a material comprising a ceramic or an inorganic material and may be prepared by melt-spinning process. Exemplary rock wool may include the ceramic wool purchased from KCC IBIDEN company.

In certain aspects, the mineral, as used herein, may be a naturally occurring substance which may not be particularly limited by a chemical composition. Exemplary mineral may usually be in a solid inorganic state and may have a crystal structure.

Preferably, the adhesive may be a thermosetting adhesive, and the method may further include hot-pressing the stacked insulation layer and the pair of inorganic fiber layer, which are stacked as the adhesive is spread to interfaces before the integrating.

Further provided is a vehicle part that may comprise the insulating fiber composite as described herein. Preferably, the vehicle part may be applied to an engine portion or an exhaust portion of a vehicle.

Still further provided is a vehicle that may comprise the insulating fiber composite as described herein.

According to various exemplary embodiments of the present invention, surface property and durability of an insulation material may be substantially improved by covering an insulation layer, which may have excellent heat-resisting property but poor durability and surface property, with an inorganic fiber layers formed with a silica non-woven fabric material having excellent surface property, such that the insulation layer may not be exposed to the outside. Particularly, the manufacturing method of the insulating fiber composite may be applied to various fields as minimizing that harmful elements to humans released from the insulation layer that may be exposed to the outside in the related arts. In addition, a component having a various and complex shape may be manufactured using the flexible insulating fiber composite and various functions may be applied using the insulating fiber composite.

Other aspects of the present invention are disclosed infra.

BRIEF DESCRIPTION OF THE DRAWINGS

It should be understood that the accompanying drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

| <Description of symbols> | |
|---|---|
| 10: insulation layer | 20: adhesive layer |
| 30: inorganic fiber layer | |

DETAILED DESCRIPTION

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

An exemplary embodiment of the present invention will hereinafter be described in detail with reference to the accompanying drawings, however, it is not limited to the exemplary embodiment of the present invention.

Further, in the description of the present invention, the detailed description of related well-known configurations and functions is not provided, when it is determined as unnecessarily making the scope of the present invention unclear.

Figure 1:
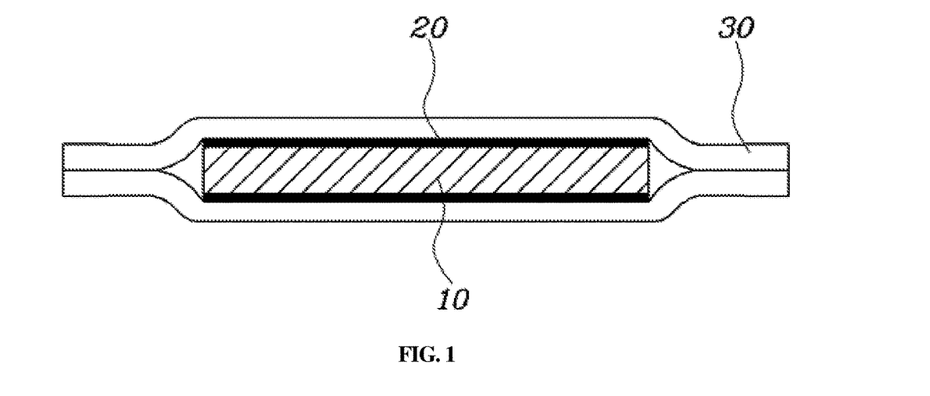
FIG. 1 is a cross-sectional view of an exemplary insulation fiber composite according to an exemplary embodiment of the present invention.
Figure 2:
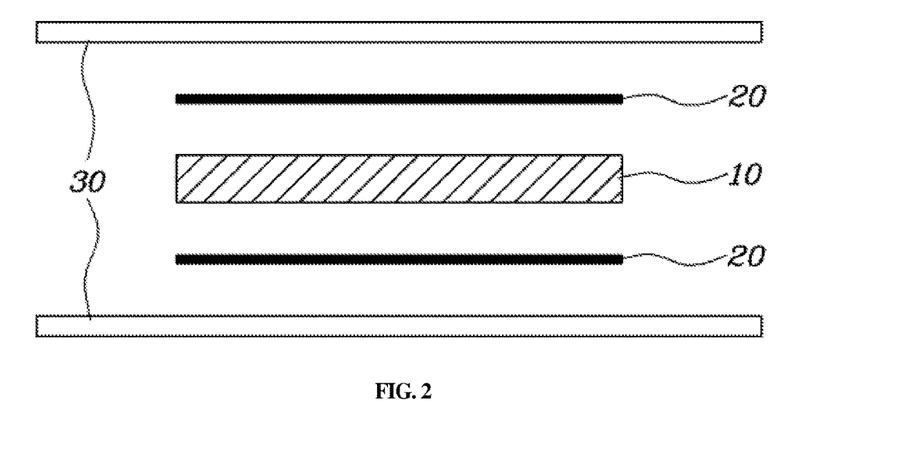
FIG. 2 is a drawing for describing a configuration of an exemplary insulation fiber composite according to an exemplary embodiment of the present invention.

FIG. 1 is a cross-sectional view of an exemplary insulation fiber composite that may have substantially improved formability and surface property according to an exemplary embodiment of the present invention, and FIG. 2 is a drawing for describing a configuration of an exemplary insulation fiber composite that may have substantially improved according to an exemplary embodiment of the present invention.

As shown in FIG. 1 and FIG. 2, the insulation fiber composite according to an exemplary embodiment of the present invention may be comprise an insulation layer 10 and a pair of inorganic fiber layer 30, which may be integrated or bonded, for example, by needle punching.

Preferably, the needle punching may be performed so that a mass per unit may be of about 300 to about 2,000 g/m$^2$.

When the mass per unit of an insulation fiber composite with excellent formability and surface property is lower than 300 g/m$^2$. durability, heat insulation property and heat-resisting property may be deteriorated due to penetration of a needle during the needle punching process. In addition, when the mass per unit thereof is greater than about 2,000 g/m$^2$, a manufacturing cost may be increased and the needle may not penetrate when the needle punching is performed, such that the insulation layer 10 and the pair of inorganic fiber layer 30 may not be integrated efficiently, even though thermal performances such as heat insulation property and heat-resisting property are improved.

Preferably, at a process to integrate the insulation layer 10 and the inorganic fiber layer 30 after positioning the insulation layer 10 between the pair of inorganic fiber layers 30, the insulation layer 10 may not be exposed to the outside.

For instance, the insulation layer 10 may be not exposed to the outside when the insulation layer 10 and the inorganic fiber layers 30 are integrated by positioning the insulation layer 10. In particular, the insulation layer 10 may be positioned at a central portion between the pair of inorganic fiber layers 30 and then needle punching may be performed when the pair of inorganic fiber layer 30 have the greater planar surface areas than with the planar surface area of the insulation layer 10.

Because durability of conventional insulation materials, such as rock wool, ceramic fiber, mineral, and the like constituting the insulation layer in the related arts may not have sufficient surface property, the insulation layer 10 may be covered by the pair of inorganic fiber layer 30 and may not be exposed to outside. As consequence, durability of an insulation fiber composite may be improved and the formability and surface property thereof may be simultaneously and substantially improved In addition, the insulation layer 10 is not exposed to the outside, and in particular, the insulation layer having harmful garments may not be exposed to the outside. Accordingly, harmful substance of the insulation layer 10 may be prevented from leaking to the outside and the user's skin trouble that may occur by the exposure of the insulation layer may be prevented.

As such, an insulation fiber composite with excellent formability and surface property according to an exemplary embodiment of the present invention may be applied widely in many fields. Particularly, when the insulation fiber composite is applied to a vehicle, high-quality of a vehicle may be promoted. The insulation fiber composite with excellent formability and surface property according to an exemplary embodiment of the present invention may further include an adhesive layer 20 applied in an interface between the insulation layer 10 and inorganic fiber layer 30.

Preferably, a thermosetting adhesive may be used as the adhesive layer 20 according to an exemplary embodiment of the present invention. In particular, the thermosetting adhesive layer 20 may not be melted or decomposed by a high temperature so that durability thereof may not deteriorated when the adhesive layer 20 is exposed to a high temperature condition during normal use, for example, normal vehicle operation.

In addition, the adhesive according to an exemplary embodiment of the present invention may include an epoxy resin which can form the reticular structure of three dimensions in the interior structure of the insulation layer 10 and the inorganic fiber layer 30 respectively having a non-woven fabric shape. For instance, the adhesive may include one or more selected from the group consisting of a bisphenol-A diglycidyl ether, a bisphenol-B diglycidyl ether, a bisphenol-AD diglycidyl ether, a bisphenol-F diglycidyl ether, a bisphenol-S diglycidyl ether, a polyoxy propylene diglycidyl ether, a bisphenol-A diglycidyl ether polymer, a phosphazene diglycidyl ether, a bisphenol-A novolac epoxy, a phenolnovolac epoxy resin, and an o-cresol novolac epoxy resin.

The insulation layer 10 according to an exemplary embodiment of the present invention may be manufactured in a non-woven fabric and may include one or more of ceramic fiber, rock wool, and mineral such that a heat-resisting temperature thereof may be of about 600° C. or greater thereby ensuring excellent thermal performance.

The insulation layer 10 may be formed in a non-woven fabric by using a ceramic short fiber and on the like. In addition, the inorganic fiber layer 30 according to an exemplary embodiment may include a silica non-woven fabric which may be manufactured by needle punching a silica fiber.

Accordingly, as a product may be flexibly manufactured depending on integration by needle punching, the product may be formed and be applied to vehicle components having various shapes of three dimensions.

Preferably, the silica fiber may be a long fiber having a length of about 30 mm or greater. When the silica non-woven fabric is manufactured by using a silica fiber having a length less than about 30 mm, a binding force between fibers by needle punching may be deteriorated such that durability may be deteriorated.

The silica fiber may contain a silica ($SiO_2$) in an amount of about 50 wt % or greater based on the total weight of the silica fiber. When the amount of the silica is less than about 50 wt %, a heat-resistance to a temperature of about 600° C. or greater may not be ensured such that heat-resisting property may be deteriorated.

As described above, a silica non-woven fabric being manufactured by needle punching silica fibers may be used as the inorganic fiber layer 30, and preferably, a mass per unit of the manufactured silica non-woven fabric may be of about 200-1,000 g/m$^2$ and a tensile strength thereof may be of about 0.2 kgf/cm$^2$ or greater. When the mass per unit is less than about 200 g/m$^2$, a binding force between fibers may be deteriorated so that durability may be decreased. When the mass per unit is greater than about 1,000 g/m$^2$, the mass per unit of the manufactured fiber composite may be greater than about 2,000 g/m$^2$, such that manufacturing cost may be increased as the needle punching is difficult.

Further, a manufacturing method for an insulation fiber composite according to an exemplary embodiment of the present invention will be described with reference to the drawings.

Figure 3:
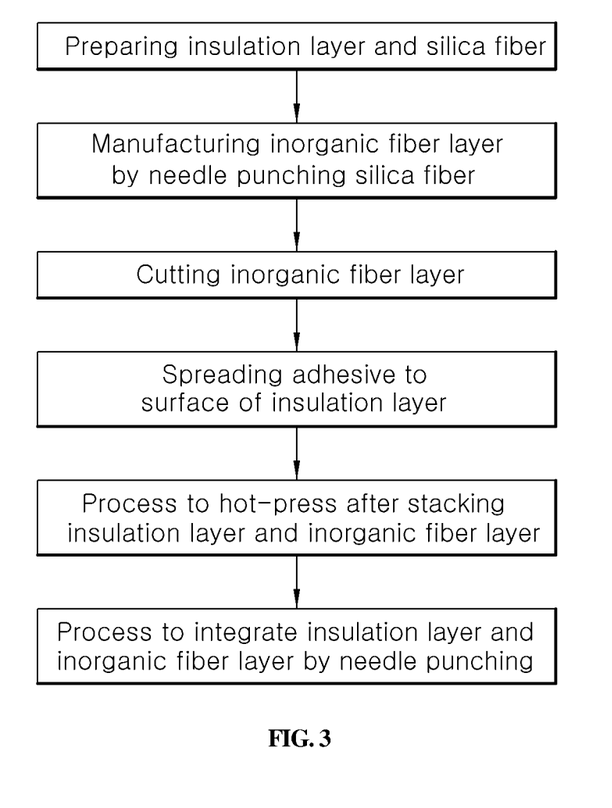
FIG. 3 is a flowchart showing an exemplary manufacturing method for an exemplary insulation fiber composite according to an exemplary embodiment of the present invention.

FIG. 3 is a flowchart showing an exemplary manufacturing method for an exemplary insulation fiber composite with excellent formability and surface property according to an exemplary embodiment of the present invention.

As shown in FIG. 3, a manufacturing method for an insulation fiber composite according to an exemplary embodiment of the present invention may include: a preparing process, an adhesive layer spreading process, and an integrating process.

In the preparing process, prepare the insulation layer 10 and the pair of inorganic fiber layer 30 may be prepared. The insulation layer 10 and the pair of the inorganic fiber layers 30 may be are formed in a non-woven fabric shape. Subsequently, the pair of inorganic fiber layer 30 may be cut, in particular, the inorganic fiber layer 30 may be cut to be greater than an area of the insulation layer 10.

Accordingly, the inorganic fiber layer 30 may cover the insulation layer 10 such that durability of the manufactured fiber composite may be improved with excellent formability and surface property.

The preparing process according to an exemplary embodiment of the present invention may include an inorganic fiber needle punching step needle punching a silica fiber having the length of about 30 mm or greater. As such, the manufactured inorganic fiber layer 30 may be formed in a non-woven fabric and have a mass per unit of about 200 to 1,000 g/m² and a tensile strength of about 0.2 kgf/cm² or greater.

The inorganic fiber layer 30 may be positioned on a surface of the thus manufactured insulation fiber composite thereby providing improved durability and surface property.

In the adhesive layer spreading process, the thermosetting adhesive may be applied, for example, by spreading, coating or spraying, on a surface of the insulation layer 10 so as to form the adhesive layer 20 in an interface between the inorganic fiber layer 30 and the insulation layer 10. For instance, an epoxy resin may be used as the adhesive according to an exemplary embodiment of the present invention.

The manufacturing method for an insulation fiber composite with excellent formability and surface property according to an exemplary embodiment of the present invention may further include a hot-pressing process before integration process. For example, the insulation layer 10 and the pair of inorganic fiber layer 30 may be coupled or bonded by hot-press using, for example, a roller, after positioning the insulation layer 10 where the adhesive layer 20 is applied or spread between the pair of inorganic fiber layer 30.

As such, by improving a binding force between the inorganic fiber layer 30 and the insulation layer 10, durability of an insulation fiber composite may be improved.

Hereinafter, a result of tests is represented on the following Table 1 based on performing a temperature rise confirmation test and a tensile strength test of a contact portion after contacting the manufactured fiber composite according to an exemplary embodiment of the present invention and Comparative Examples being used as a traditional insulation to a heat source of 300° C.

Figure 4:
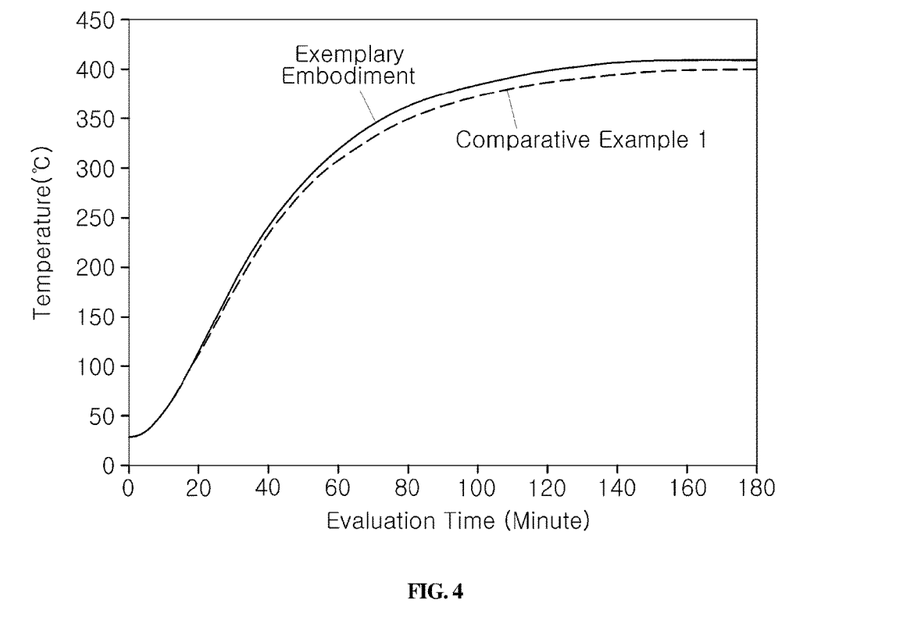
FIG. 4 is a graph showing a result of a temperature rise confirmation test regarding an exemplary insulation fiber composite according to an exemplary embodiment of the present invention and Comparative Example.

FIG. 4 is a graph showing a result of temperature increase confirmation test for an insulation fiber composite according to an exemplary embodiment of the present invention and Comparative Example.

TABLE 1

|  | Exemplary Embodiment | Comparative Example 1 | Comparative Example 2 |
| --- | --- | --- | --- |
| composition | Inorganic fiber layer ×2 (Silica fiber 300 g/m²) Insulation (Ceramic blanket 600 g/m²) | Silica fiber 1,200 g/m² | Ceramic blanket 1,200 g/m² |
| Temperature | 409.9° C. | 401.7° C. | 411.0° C. |
| Tensile strength | 0.2 kgf/cm² | 0.2 kgf/cm² | 0.1 kgf/cm² (Fragment) |
| Note | Possibility to apply to vehicle component | Possibility to apply to vehicle component | Impossibility to apply to vehicle component |

As shown in Table 1 and FIG. 4, when the insulation fiber composite was manufactured according to an exemplary embodiment of the present invention, a temperature of a contact portion of a heat source was 409.9° C. so that heat insulation property was improved. In addition, a tensile strength may be improved to 0.2 kgf/cm², which may be sufficient to be used as a vehicle component. In contrast, in Comparative Example 1, much heat was exposed to the outside so that heat insulation property was decreased. In Comparative Example 2, a tensile strength was substantially reduced, durability was low, and fragments were generated and the surface quality was inferior. Accordingly, Comparative Examples may not be used as a vehicle component.

As described above, according to various exemplary embodiments of the present invention, high-quality of a vehicle may be promoted and lifespan of a manufactured vehicle component may be improved when the insulation fiber composite of substantially improved durability, formability and surface quality are used in the vehicle.

As described above, while this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An insulation fiber composite comprising:
an insulation layer having heat-resistance; and
a pair of inorganic fiber layers, a first inorganic fiber layer of the pair being stacked on an upper surface of the insulation layer and a second inorganic fiber layer of the pair being stacked on a lower surface of the insulation layer, respectively,
wherein the first inorganic fiber layer and the second inorganic fiber layer each has a greater planar surface area than a planar surface area of the insulation layer such that the insulation layer is not exposed to an exterior when the insulation layer and the pair of the inorganic fiber layers are stacked;

wherein the insulation fiber composite has a mass per unit ranging from about 300 to about 2,000 g/m$^2$;

wherein the pair of inorganic fiber layers are needle-punched to integrate with the insulation layer in a state that the pair of inorganic fiber layers are stacked on the insulation layer;

wherein the inorganic fiber layers are a silica non-woven fabric made of a silica fiber having the length of about 30 mm or greater; and wherein the insulation fiber composite is applied to an engine portion or an exhaust portion of a vehicle.

2. The insulation fiber composite of claim 1, further comprising an adhesive layer disposed between the insulation layer and each the inorganic fiber layers.

3. The insulation fiber composite of claim 2, wherein the adhesive layer is a thermosetting adhesive.

4. The insulation fiber composite of claim 1, wherein the insulation layer comprises any one of ceramic fiber, rock wool, and mineral.

5. The insulation fiber composite of claim 1, wherein the insulation layer has a heat-resisting temperature about 600° C. or greater.

6. The insulation fiber composite of claim 1, wherein the silica non-woven fabric comprises a silica (SiO$_2$) in an amount of about 50 wt % or greater based on the total weight of the silica non-woven fabric, and the silica non-woven fabric has a heat-resisting temperature of about 600° C. or greater.

7. The insulation fiber composite of claim 6, wherein the silica non-woven fabric has a mass per unit of about 200 to 1,000 g/m$^2$ and a tensile strength of about 0.2 kgf/cm$^2$ or greater.

8. A method of manufacturing an insulation fiber composite, comprising:

preparing an insulation layer having heat-resistance and formed in a non-woven fabric;

preparing a pair of inorganic fiber layers formed in a non-woven fabric to have a greater a planar surface area than a planar surface area of the insulation layer;

spreading an adhesive on an upper surface and a lower surface of the insulation layer;

covering the insulation layer with the pair of the inorganic fiber layer, a first inorganic fiber layer of the pair being stacked on an upper surface of the insulation layer and a second inorganic fiber layer being stacked on a lower surface of the insulation layer, respectively; and integrating the insulation layer and the inorganic fiber layers by needle punching so that a mass per unit of the insulation fiber composite is of about 300 to 2,000 g/m$^2$, wherein the insulation fiber composite is applied to an engine portion or an exhaust portion of a vehicle.

9. The method of claim 8, further comprising:

needle punching a silica fiber having the length of about 30 mm greater so as to prepare the inorganic fiber layers having a mass per unit of about 200 to 1,000 g/m$^2$ and a tensile strength of about 0.2 kgf/cm$^2$ or greater.

10. The method of claim 9, wherein the insulation layer comprises any one of ceramic fiber, rock wool, and mineral.

11. The method of claim 9, wherein the silica fiber comprises a silica (SiO$_2$) in an amount of about 50 wt % or greater such that the insulation layer has a heat-resisting temperature of about 600° C. or greater.

12. The method of claim 9, wherein the adhesive is a thermosetting adhesive.

13. The method of claim 12, further comprising hot-pressing the stacked insulation layer and the pair of the inorganic fiber layers as the adhesive being spread on interfaces thereof before the integrating process.

14. A vehicle part that comprises an insulating fiber composite of claim 1.

15. A vehicle that comprises an insulating fiber composite of claim 1.

* * * * *